Oct. 14, 1969   W. N. SUTLIFF ET AL   3,472,326
FISHING TOOL ENERGIZER
Filed Feb. 5, 1968

INVENTORS.
WAYNE N. SUTLIFF
JIM L. DOWNEN
By
ATTORNEY.

3,472,326
FISHING TOOL ENERGIZER
Wayne N. Sutliff and Jim L. Downen, 2931 Pierce,
Bakersfield, Calif. 93308
Filed Feb. 5, 1968, Ser. No. 702,876
Int. Cl. E21b 1/06, 1/10; E21c 15/00
U.S. Cl. 175—299                                    4 Claims

ABSTRACT OF THE DISCLOSURE

A deep well energy storage tool incorporated in a drill string just above a fishing tool assembly including a fishing tool, a jar and one or more drill collars, said energy storage tool incorporating multiple coiled springs arranged serially but separately and concurrently compressed by tension applied to said fishing tool assembly by pulling upward on said drill string, the energy thus stored in said springs causing rapid upward acceleration of said drill collars incident to the tripping of said jar, thereby delivering a sharp upward blow through said jar to said fising tool.

BACKGROUND OF THE INVENTION

Field of the invention

For the functioning of jars at the lower end of a drill string dependence for long was placed upon applying a substantial upward tension to said drill string so that the entire string would act like a rubber band and rapidly accelerate upward upon the tripping of the jar, this movement terminating in the striking of a substantial upward blow against the jar. In a perpendicular bore the above described mode of operation gives excellent results. In slanted bores however, the friction developing between the drill string and the walls of the bore or the casing therein has been found to interfere with the proper operation of a jar primarily through the resiliency of the drill string.

Description of the prior art

To solve the problem in this art above described a pneumatic tool was disclosed in U.S. Patent 2,953,352, issued Sept. 20, 1960, to Derrel D. Webb. This tool was placed in a drill string just above a fishing tool assembly and embodies a piston chamber confining a compressible gas which was compressed by the extension of said tool by an upward pull on the drill string, the energy thus stored in the tool being applied to the fishing assembly to cause the latter to function and, at the conclusion of the free movement in the jar, the delivery of a sharp upward blow to the jar and the fishing tool attached thereto.

SUMMARY OF THE INVENTION

The patented tool above described requires a high degree of efficiency in packing glands and piston seals for retaining in the tool the gas upon which it depends for its operation. These elements are difficult to maintain for long service periods without withdrawing the tool for overhaul.

It is the primary object of the present invention to provide a fishing tool energizer which will possess the virtues of said patented tool and yet eliminate the defects above pointed out.

It is a further object of the present invention to provide a fishing tool energizer in which dependence is not placed upon a confined gas for storing energy in the tool to be used in actuation of the fishing tool assembly, but employs instead a series of coiled steel springs which are disposed in series lengthwise of the tool but yet are compressed concurrently by the extension of the tool whereby the expansive forces stored in all the springs are effective concurrently for energizing the fishing tool assembly incident to the tripping of the jar therein.

It is thus a still further object of the invention to provide a fishing tool energizer embodying internal and external mandrels which are telescopically related to each other, which has the capacity of storing up lineally expansive energy of a relatively high value during the telescopic extension of said tool over a relatively short distance.

A still further object of the invention is to provide a fishing tool energizer which will perform its function repeatedly and indefinitely with no substantial diminution in the amount of energy stored by the telescopic extension of the tool.

DESCRIPTION OF THE PREFERRED EMBODIMENT

Figure 1A:
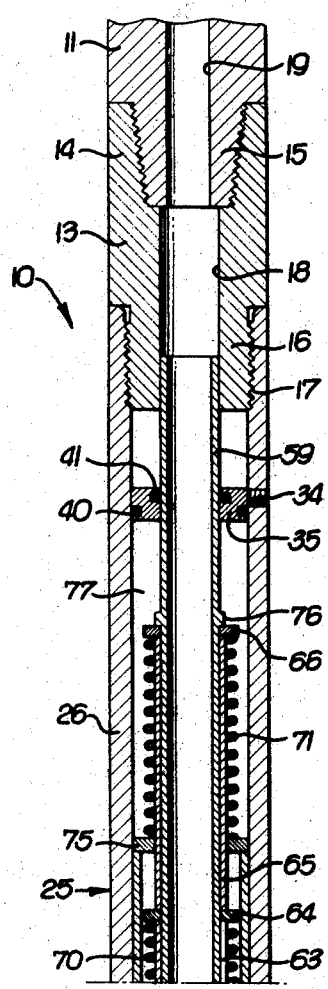
FIGURES 1–A and 1–B comprise a composite vertical sectional view of a preferred embodiment of the invention and show the same partially telescopically extended as during the conduct of a jarring operation by the drill string with which the tool is associated.

Referring specifically to the drawings, the invention is there illustrated as incorporated in a fishing tool energizer 10 which is secured, at its upper end, to the lower end of a drill string 11, said energizer having suspended from the lower end thereof a fishing tool assembly 12. The latter assembly is not illustrated in detail inasmuch as this is conventional and embraces, in the order named, downwardly from the energizer 10, one or more drill collars, a jar, and a fishing tool.

The energizer 10 includes an upper sub 13 provided at its upper end with a pin box 14 for receiving a pin 15 provided on the lower end of drill string 11. The sub 13 also includes an externally threaded downward extension 16 of reduced diameter having external threads 17. The sub 13 also has an axial bore 18 which is substantially larger in diameter than the axial drilling fluid passage 19 provided in the drill string 11.

The energizer 10 also includes a tubular outer mandrel 25 which embraces a tubular spring housing 26 and a tubular spline housing 27. The spring housing 26 has internal threads at its upper end which screw onto the external threads 17 of the upper sub 13 and is also internally threaded at its lower end to screw onto external threads 28 of a head 29 provided on the upper end of spline housing 27. The head 29 is provided with an axial bore 30 of the same diameter as bore 18. Bore 30 has a counter bore 31 which extends from the head 29 to the opposite end of spline housing 27. Slots are milled from the face of the counter bore 31 to provide outer splines 32. The lower end of counter bore 31 is threaded to receive a threaded plug 33 comprising the lower head of spline housing 27.

The tubular spring housing 26 is provided with a tapped radial hole for receiving a set screw 34 for fixing in a given longitudinal position within said spring housing a metal ring 35 whch slidably fits within said housing and has an axial bore of the same diameter as bores 18 and 30. The ring 35 has external and internal annular grooves for receiving O-rings 40 and 41. Spline housing 27 is provided with a radial tapped hole for receiving a set screw 42 for securing a ring 43 in the upper end of counter bore 31. This ring slidably fits into said counter bore and has an axial bore having the same diameter as bores 18 and 30. Ring 43 has external and internal annular grooves for receiving O-rings 44 and 45.

Energizer 10 includes a lower sub 46 having a conventional drill string pin 47 which screws into the drill string box 48 provided at the upper end of fishing tool assembly 12. The sub has an axial bore 49 of the same diameter as the drilling fluid circulating passage 50 of said fishing tool assembly. At its upper end the sub 46 has a threaded counter bore 55 into which is screwed externally threaded lower end of a tubular inner mandrel 56. This mandrel has an internal bore 57 of the same diameter as drilling fluid passage 50 and includes a relatively heavy spline section 58 at its lower end and a relatively light and considerably longer spring mounting tubular section 59 at its upper end. The spline section 58 is provided with radial inner splines 60 which mesh with outer splines 32.

The spring mounting tube 59 of the inner mandrel has an outside diameter which causes this to slideably fit bores 30 and 18 as shown in the drawings. Coiled about the tube 59 just above the upper spline housing head 29, and resting thereon, is a heavy coiled spring 61. Slideably fitting tube 59 and resting on coil spring 61 is a slide collar 62 on top of which rests a pressure sleeve 63 on top of which sleeve rests another slide collar 64 and on top of this rests another pressure sleeve 65 on top of which rests another slide collar 66.

Coiled about pressure sleeve 63 is a heavy coil spring 70. Coiled about pressure sleeve 65 is a heavy coil spring 71.

Slideably fitting within the tubular spring housing 26 of the outer mandrel 25 and resting on the upper head 29 of the spline housing is a compression sleeve 72, a compression collar 73, which rests on said sleeve, a compression sleeve 74 which sits on said collar and a compression collar 75 which sits on said sleeve.

Compression collar 73 slideably fits the outer surface of pressure sleeve 63 and lies between the slide collar 62 and the spring 70. Compression collar 75 slideably fits the outer surface of pressure sleeve 65 and lies between slide collar 64 and coil spring 71.

Figure 1B:
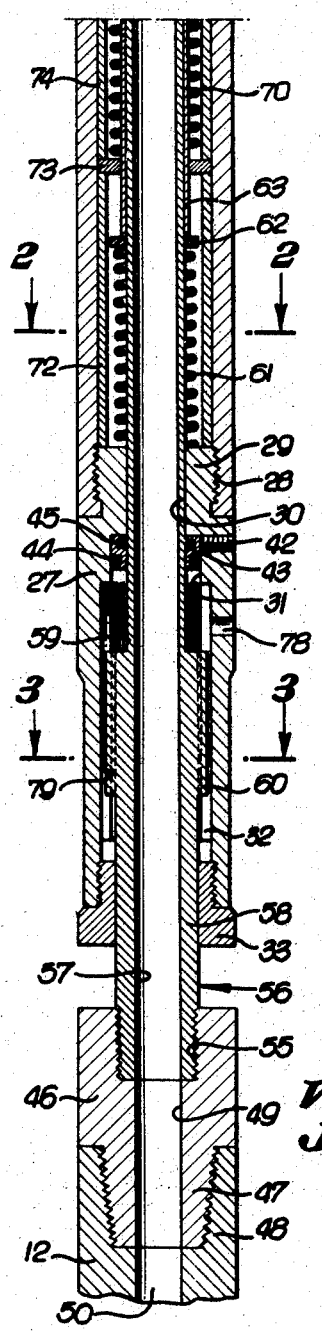
Figure 2:
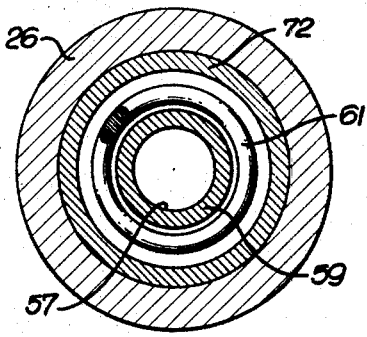
FIGURE 2 is an enlarged cross-sectional view taken on the line 2—2 of FIGURE 1–B.
Figure 3:
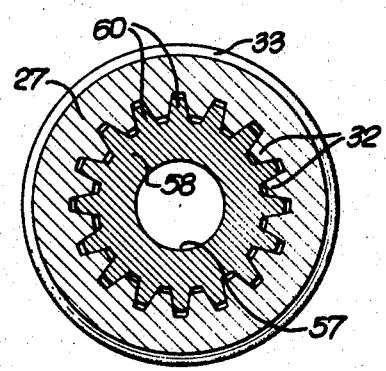
FIGURE 3 is an enlarged cross-sectional view taken on the line 3—3 of FIGURE 1–B.

After the sleeves, collars and springs above described have been assembled on the tube 59 of inner mandrel 56, the three springs are compressed by shifting the upper slide collar 66 downwardly below the position in which said upper collar is shown in FIGURE 1-A and an annular shoulder 76 is formed by welding or brazing on tube 59, which shoulder forms an upper stop for sliding movement between slide collar 66 and said tube and retains said three springs and associated parts in the assembled relationship in which they are shown in the drawings.

The upper end of tube 59 slideably extends into the bore 18 a sufficient distance so that this tube is never withdrawn from said bore during telescopic extension of the fishing tool energizer 10. The double sealing rings 35 and 43 form spaced double seals between the inner mandrel tube 59 and the inner faces of the tubular spring housing 26 and the spline housing 27 of the outer mandrel 25. These seals thus seal off opposite ends of the annular inter-mandrel space 77 occupied by the springs 61, 70 and 71 which space may be filled with a body of lubricant introduced thereinto during the assembly of the tool.

The tubular spline housing 27 is provided with a radial port 78 through which well fluid may freely pass into the spline chamber 79 provided within the spline housing 27. This fluid keeps the splines 32 and 60 adequately lubricated for sliding operation.

While the fishing tool energizer 10 has many different uses in oil well operations, it has been especially provided for association with a fishing tool assembly 12 which is suspended from the lower end of the energizer 10 which in turn is suspended from the lower end of a drill string 11. When the fishing tool (not shown) on the lower end of the fishing tool assembly 12 has been maneuvered into gripping relation with a fish to be removed from the well, and the equipment is therefore in readiness for a jarring operation, the drill string 11 is lifted from the rig supporting the same to compress the springs of energizer 10 as shown in FIGURES 1-A and 1-B of the drawings. These views show the energizer 10 telescopically extended only about half of the full distance to which such extension is possible. The lifting on the drill string 11 is continued to fully extend the energizer 10 and thus impart a maximum degree of compression to the springs thereof before the time interval required for the jar to release itself has elapsed. When the temporary lock in the jar is released, the tension built up in the springs of the energizer 10 is adequate to impart a rapidly upwardly accelerated movement to the elements of the fishing tool assembly 12 located between said jar and the energizer 10, and comprising mainly one or more drill collars which are quite heavy. This upward movement of these drill collars is brought to a sudden halt when the jar has been fully extended thereby striking a heavy upward blow on the jar which is transmitted through this and the fishing tool to the fish.

The energizer 10 thus facilitates the repeated operation of the jar merely by lifting and lowering the drill string 11 repeatedly a realtively short distance and without placing an undue strain on this drill string and without producing excessive wear on the drill string where it rubs against the wall and casing of the well bore where the latter is slanted or curved away from the original alignment of the bore.

We claim:
1. A fishing tool energizer comprising
   a tubular outer mandrel;
   a tubular inner mandrel disposed telescopically within said outer mandrel;
   means for connecting one of said mandrels to a drill string;
   means for connecting the other of said mandrels to a fishing tool assembly;
   spline means provided between said mandrels for preventing relative rotation therebetween and limiting the telescopic extension of said tool from its normal fully retracted position;
   spring means coiled about said inner mandrel and confined within said outer mandrel, said spring means yieldably holding said mandrels in fully retracted relationship and yieldably resisting the telescopic extension of said tool by the application of a tensile strain thereto through said drill string whereby a substantial amount of tensile energy may be stored up in said spring means by the extension of said tool, which energy will be released upon the automatic tripping of a jar included in said fishing tool assembly to strike a heavy upward blow against said jar, said spring means comprising
       an axial series of springs of common diameter placed in endwise tandem alignment in the annular space between said mandrels;
       means provided on one of said mandrels and abutting individually against that end of each of said springs which lies in the direction said other mandrel moves with respect to said one mandrel in extending said tool; and
       means provided on said other mandrel and abutting individually against the opposite ends of said springs,
       whereby the extension of said tool a given distance results in compressing each of said springs by reducing its length by the amount of that distance.

2. A fishing tool energizer as recited in claim 1, wherein an annular internal shoulder is provided on said outer mandrel at one end of said annular spring confining space; and wherein
an annular shoulder is formed externally on said inner mandrel near the opposite end of said annular spring confining space, and wherein said plurality of springs is arranged serially in end-to-end relation coiled about said inner mandrel with said two annular shoulders confining opposite ends of said spring series;

means comprising successive slide collars and sleeves closely fitting said inner mandrel with each of said sleeves located inside one of said springs and with each of said collars held by said sleeves in spaced relation from the other of said collars and constituting a stop for one end of one of said springs; and a series of compression collars and sleeves closely fitting inside said outer mandrel within said spring enclosing chamber, each of said compression collars extending inwardly between one of said inner mandrel slide collars and the adjacent end of one of said springs whereby the telescopic extension of said fishing tool energizer compresses one of said springs between said internal annular shoulder of said outer mandrel and the initial slide collar on said inner mandrel while each of the other springs is compressed between one of said compression collars and the next slide collar thereabove on said inner mandrel.

3. A fishing tool energizer as recited in claim 2, wherein said tubular outer mandrel includes a tubular spring housing and a tubular spline housing said spline housing having upper and lower heads, said upper spline housing head being threadedly received into the adjacent end of said spring housing and providing the aforesaid annular outer mandrel shoulder from which compression is applied to said springs during the extension of the energizer.

4. A fishing tool energizer as in claim 3, wherein said spline housing is provided with a counter bore in which outer splines are formed, said inner mandrel having a heavy tubular spline section at one end thereof on which inner splines are formed which intermesh with said outer splines, the balance of said inner mandrel comprising a relatively thin walled tube, said spline housing upper head having a bore which said tube slideably fits;

a double seal ring inserted into the inner end of said spline housing counter bore, said ring forming a double seal between said inner mandrel tube and said spline housing; and a double seal ring surrounding said inner mandrel tube near the upper end thereof and making a double seal between said tube and said outer mandrel, said seal rings comprising the means aforesaid for closing upper and lower ends of the inter-mandrel annular space enclosing said spring means.

References Cited

UNITED STATES PATENTS 2,815,930   12/1957   Storm      175—299 X
2,882,018    4/1959   Andrew      175—299

JAMES A. LEPPINK, Primary Examiner

U.S. Cl. X.R.

175—321